Patented Sept. 5, 1950

2,521,470

UNITED STATES PATENT OFFICE 2,521,470

METHOD OF BONDING CELLULAR THERMOPLASTIC BODIES

Lorne A. Matheson, Midland, Mich., assignor to The Dow Chemical Company, Midland, Mich., a corporation of Delaware No Drawing. Application August 3, 1945, Serial No. 608,846

9 Claims. (Cl. 154—139)

1

This invention concerns an improved method for bonding bodies of cellular thermoplastic materials, particularly of vinyl aromatic resins, to one another or to other solid materials such as wood, leather, or metals so as to unite the bodies and form a composite article therefrom.

Munters et al., in United States Patent 2,023,204 and a corresponding French Patent 732,594, teach a method of making cellular thermoplastic bodies such as those with which this invention is concerned, show that such material contains a large number of individually closed thin-walled cells, and also point out the need of bonding together pieces of the cellular bodies or sheets, the term "sheet" being employed herein as snyonymous with body, to form larger masses thereof having special shapes. In the French Patent 732,594, it is indicated that the bonding may be accomplished by wetting the exposed surfaces of cellular bodies with a lacquer and pressing the bodies together. The United States Patent 2,023,204 does not indicate how the bonding is to be accomplished.

In the industrial employment of the cellular thermoplastic bodies, e. g. as heat insulating material or as a packing of low-bulk density, there are numerous instances in which such bonding of pieces of the cellular bodies either to one another or to other materials is of importance. For instance, in filling or lining, irregular shaped containers with the cellular materials, it often is most convenient to cut the cellular material into a plurality of pieces that can be fitted together inside the container and to bond the pieces together during the operation of fitting them together within the container. Again, there are instances in which the cellular material may advantageously be cemented to a surface of steel or wood, or may be provided with a protective layer of leather, etc.

Although bonding of the cellular thermoplastic bodies to one another or to other materials may be accomplished in the manner proposed in the above-mentioned Munters French Patent 732,594, or by other usual bonding methods, the conventional modes of bonding are inconvenient and require close attention and good technique in order to obtain a satisfactory bond. For example, lacquers or solvents, when applied to the cellular material, tend to dissolve the very thin walls thereof and create pockets so that there are only a few points of bondage. In this connection it may be mentioned that the walls of the cellular material are usually of less than 0.01, and often of less than 0.001, inch thickness and,

2 therefore, are highly susceptible to the dissolving action of liquid solvents. Heating of an exposed surface of the cellular body to a temperature sufficient to plastify the same followed by immediate pressing of the heated surface against the material to which it is to be bonded is inconvenient, since the times of heating and of withdrawing the cellular material from the heating zone and pressing it against the other material are very brief and must be controlled accurately in order to obtain a satisfactory bond.

I have found that the cellular thermoplastic materials may satisfactorily and conveniently be bonded together, or to other solid materials, by exposing a surface of the cellular material to the vapors of a solvent for the thermoplastic and then pressing the treated surface against the material to which it is to be bonded. The operations are easily accomplished and are such as to permit considerable latitude in the time of each operation without impairing the bond which is formed. Apparently, what happens during the vapor treatment is that a small amount of vapor condenses on the exposed surfaces of the cellular thermoplastic material, dissolving a trace of the material and forming a thin film of lacquer at the surface. However, the exposed surfaces are thereby quickly heated to approximately the temperature of the vapors without the remainder of the body of the thermoplastic material being heated appreciably. When this condition is reached, there is little further tendency toward condensation of the vapors on the exposed surfaces of the cellular material. Hence, there is little tendency toward complete dissolving of the cell walls such as to destroy them. It is, of course, well known that the cellular materials are excellent heat-insulating materials and that heat applied at an exposed surface does not rapidly penetrate into the body of the cellular thermoplastic.

It is, of course, not desirable that the thermoplastic material be exposed to the solvent vapors over a prolonged period of time, since, even though vapor condensation no longer takes place, the lacquer formed at the surface of the cellular body is capable of gradually absorbing the vapors and causing a further, though gradual, dissolving of the thermoplastic material. The time over which surfaces of the cellular material may satisfactorily be exposed to the solvent vapors varies with change in the temperature of the vapors and in general is shortened as the temperature is raised. In most instances the time of exposure to the solvent vapors is less than 20 seconds and preferably less than 10 seconds. When using vapors of a solvent of fairly high boiling point, e. g. a solvent of boiling point above 100° C., the time of exposure of the cellular material to the vapors may be even shorter, e. g. less than 5 seconds.

After completing the treatment with solvent vapors, the cellular material is removed and its treated surfaces are pressed, e. g. by hand or in a press, against the material to which it is to be bonded. The time interval between removal of the cellular material from the solvent vapors and pressing of the material against the solid with which it is to be bonded is usually less than 20 seconds and preferably less than 10 seconds. Examples of thermoplastic cellular resin bodies or sheets which may be bonded as just described are those prepared from polystyrene, or from other polymers or copolymers of vinyl aromatic compounds such as orthochlorostyrene, parachlorostyrene, metachlorostyrene, orthomethylstyrene, para-methylstyrene, ortho-ethylstyrene, meta-ethylstyrene, para-ethylstyrene, isopropylstyrene, which materials are for convenience hereinafter referred to generically as "vinylbenzene polymers"; and further such equivalents as methyl methacrylate, ethyl methacrylate, or vinyl acetate, etc. may be used. It is, of course, necessary that the cellular thermoplastic body be one which is capable of being dissolved at least to a slight extent by the solvent which is employed in vaporized form.

The solvents which are used in the process are ones having boiling points above room temperature, e. g. between 50° and 170° C. and preferably between 60° and 100° C. Examples of such solvents are carbon tetrachloride, chloroform, ethylene chloride, propylene chloride, tetrachloro ethylene, benzene, toluene, xylene, chlorobenzene, orthodichlorobenzene, etc.

In practice the solvent is boiled under reflux, preferably within a vertical chamber which is cooled in an upper section thereof so as to prevent appreciable escape of the vajors into the room. In most instances a fairly sharp line of demarkation can be maintained between the vapors of the solvent within said chamber and the atmosphere above the vapors. A piece of the cellular thermoplastic material, e. g. cellular polystyrene, of desired shape is lowered into the upper section of the chamber so that the surface thereof to which a bond is to be formed is in contact with the solvent vapors. The cellular body is of a temperature below that of the vapors, e. g. below 50° C., and usually at room temperature, prior to contact with the vapors. Contact with the vapors is maintained for only a short time, e. g. from 0.1 to 10 seconds, whereupon the cellular material is withdrawn from the chamber and within 20 seconds and preferably immediately is pressed against another surface, e. g. of a similar cellular material or of wood, leather, or material to which it is to be bonded. After pressing the materials together for only a short time, usually less than one-half minute, a firm bond is formed. When bonding two pieces of cellular thermoplastic material together in this manner, it is advantageous, although not necessary, that both of the surfaces which are to be joined first be treated with the solvent vapors. In many instances the bond thus formed between two pieces of cellular thermoplastic material, e. g. polystyrene, is of greater tensile strength than that of the other portions of the resultant cellular body. Upon standing, the solvent applied in minor amount to form the bond, gradually evaporates or diffuses away from the bond.

The following examples describe certain ways in which the principles of the invention have been applied, but are not to be construed as limiting the invention:

Example 1

Each of two cubes of cellular polystyrene were lowered into a chamber containing vapors of carbon tetrachloride heated to the reflux temperature so that one face of each cube was in contact with the vapors. After thus exposing portions of the cubes to the carbon tetrachloride vapors for a period of from 1 to 5 seconds, the cubes were withdrawn from the chamber and the faces thereof, which had been exposed to the vapors, were pressed together between the hands of the person carrying out the operation. After pressing the surfaces together for about 20 seconds, it was found that the cubes were strongly bonded to form a unitary mass. Subsequent testing showed that the bond was more resistant to tearing under tension than were the remaining portions of the cellular mass.

Example 2

A flat face of a body of cellular polystyrene was exposed to vapors of carbon tetrachloride for a period of about 5 seconds, as in Example 1, after which the cellular material was withdrawn and pressed against a surface of wood for about 20 seconds. The cellular polystyrene was thereafter found to be tightly bonded to the wood.

In place of the carbon tetrachloride employed as a solvent in the foregoing specific examples, I have satisfactorily used vapors of other solvents such as ethylene chloride, benzene, chlorobenzene, and orthodichlorobenzene. In general, solvent of a boiling point below 100° C. are preferred, since they permit longer contact between the vapors thereof and a cellular thermoplastic material without excessive dissolving of the latter, and they also subsequently vaporize more readily from the bonded cellular material than when using higher boiling solvents.

Other modes of applying the principles of the invention may be employed instead of those explained, change being made as regards the method herein described provided the step or steps stated by any of the following claims or the equivalent of such stated step or steps be employed.

I therefore particularly point out and distinctly claim as my invention:

1. The method of bonding a cellular thermoplastic resin sheet of the class consisting of polymers of vinyl aromatic compounds of the benzene series, vinyl acetate polymers, and methacrylic acid polymers to another sheet material, which comprises exposing an external surface of said cellular resin sheet, consisting substantially of individually closed cells of wall thickness less than 0.01 inch, to the concentrated vapors of an organic volatile solvent for said resin at a temperature of between 50° C. and 170° C., the solvent vapor temperature being substantially higher than the resin sheet temperature, for an appreciable period of less than 20 seconds, withdrawing the cellular resin from the solvent vapor contact and quickly pressing the solvent-treated surface of the cellular resin to the other sheet material, whereby the two sheet materials are bonded together and the cellular character of the resin is retained.

2. A method, as claimed in claim 1, wherein the solvent-treated external surface of the cellular resin is pressed against, and thereby bonded with, the other sheet material in less than 20 seconds after being withdrawn from contact with the solvent vapors.

3. A method, as claimed in claim 1, wherein the solvent vapors are those of a solvent having a boiling point at atmospheric pressure of between 50° and 100° C. and said vapors are at a temperature within this range when contacted with outer surfaces of the cellular resin.

4. A method, as claimed in claim 1, wherein the cellular resin is cellular polystyrene.

5. A method, as claimed in claim 1, wherein the cellular resin is cellular polystyrene, the solvent vapors are of carbon tetrachloride and are at a temperature between 50° C. and 100° C. when brought into contact with external surfaces of the cellular polystyrene, the latter is contacted with the carbon tetrachloride vapors for an appreciable time of less than 10 seconds and is then withdrawn and, within 20 seconds thereafter, the solvent-treated surface of the cellular polystyrene is pressed against another sheet material to form a bond with the latter.

6. A method, as claimed in claim 1, wherein the sheet material to which the cellular resin is bonded is wood.

7. A method, as claimed in claim 1, wherein the sheet material to which the cellular resin is bonded is leather.

8. A method, as claimed in claim 1, wherein the sheet material to which the cellular resin is bonded is a metal.

9. A method, as claimed in claim 1, wherein the cellular resin is a cellular polymer of a vinyl aromatic compound of the benzene series and the material to which it is bonded is also a cellular polymer of a vinyl aromatic compound of the benzene series.

LORNE A. MATHESON.

REFERENCES CITED

The following references are of record in the file of this patent:

UNITED STATES PATENTS

| Number | Name | Date |
|---|---|---|
| 964,524 | Kempshall | July 19, 1910 |
| 2,183,857 | Turkington | Dec. 19, 1939 |
| 2,297,248 | Rudolph | Sept. 29, 1942 |
| 2,400,720 | Staudinger | May 21, 1946 |

FOREIGN PATENTS

| Number | Country | Date |
|---|---|---|
| 157,688 | Austria | Jan. 10, 1940 |